Aug. 3, 1954
A. F. OATLEY
2,685,637
ELECTRIC GRILLING APPLIANCE
Filed Oct. 4, 1951
3 Sheets-Sheet 1
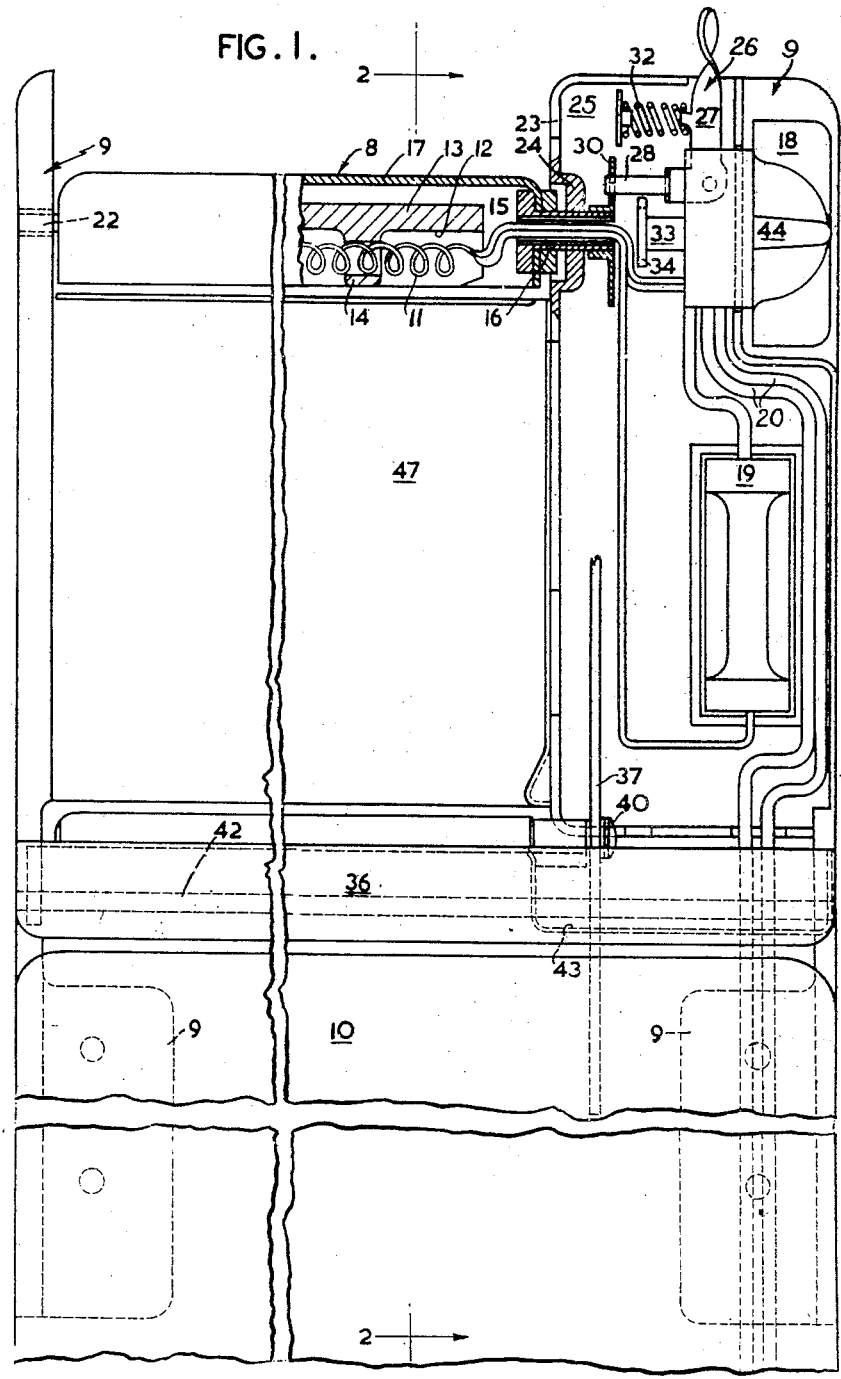
INVENTOR
Arthur F. Oatley
By Ralph B. Stewart
attorney Aug. 3, 1954          A. F. OATLEY          2,685,637
ELECTRIC GRILLING APPLIANCE
Filed Oct. 4, 1951                                           3 Sheets-Sheet 2
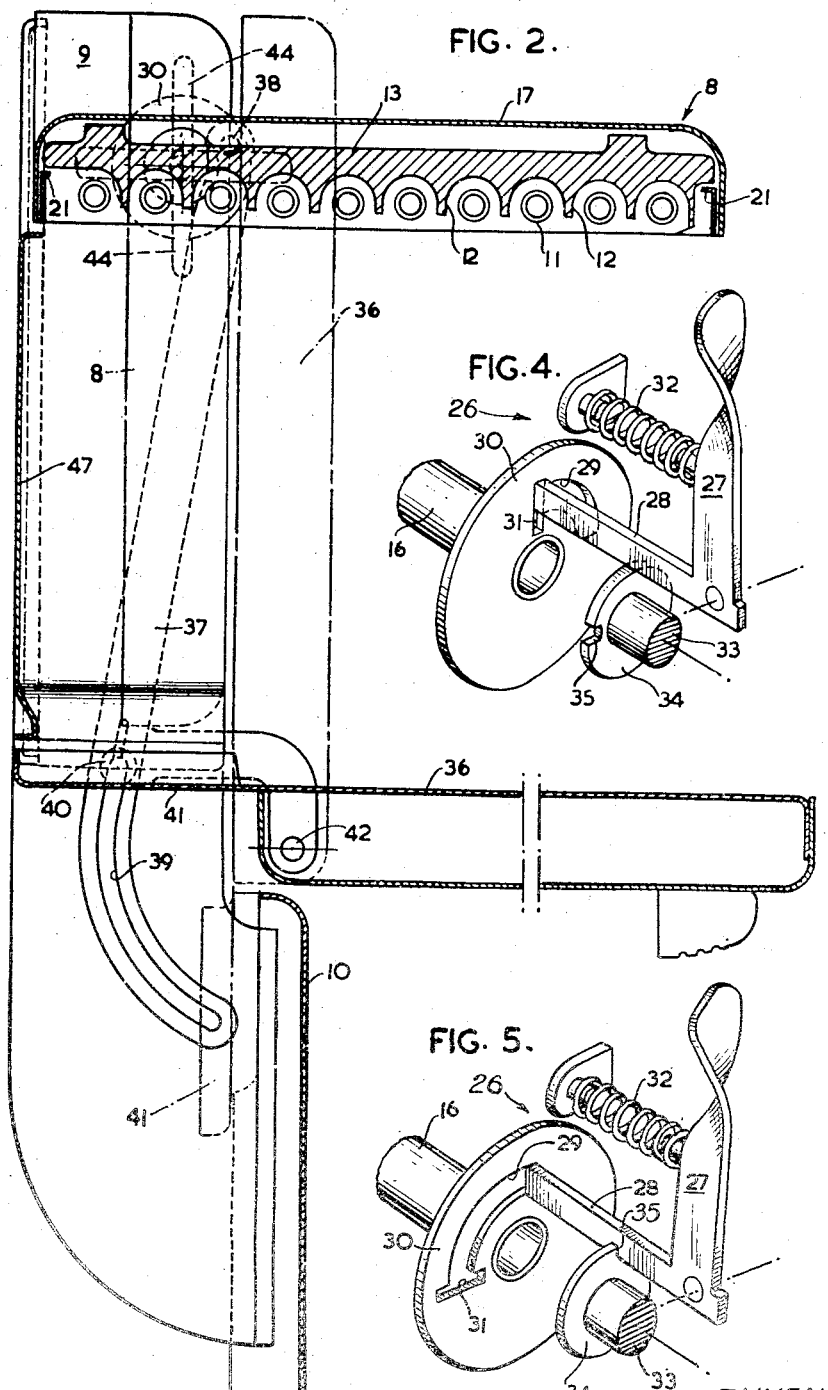
INVENTOR
Arthur F. Oatley
By Ralph B. Stewart
Attorney

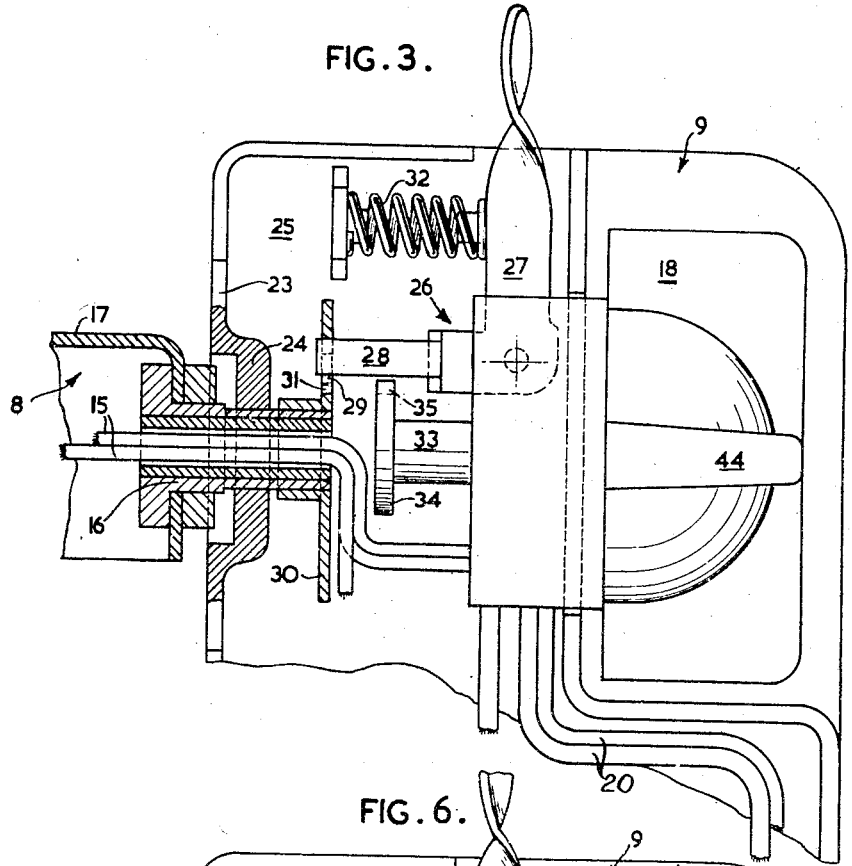
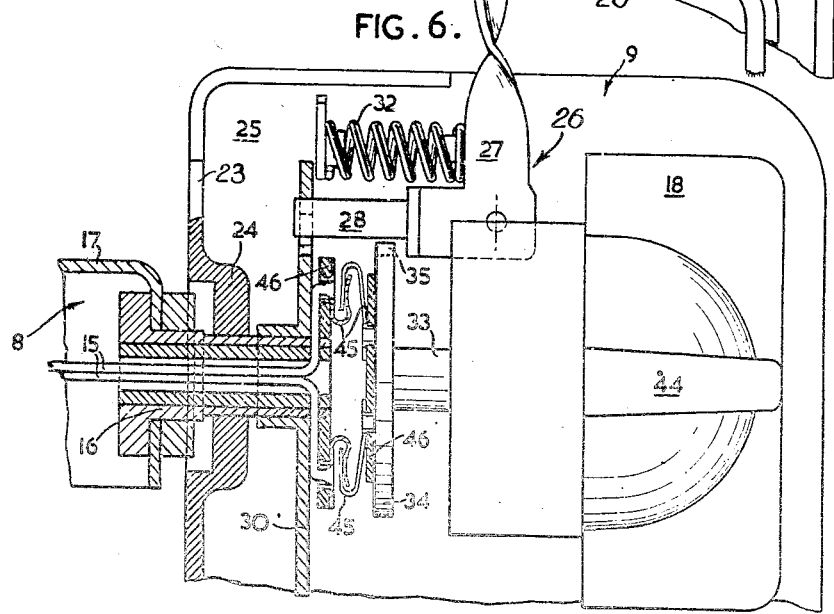

Patented Aug. 3, 1954

2,685,637

UNITED STATES PATENT OFFICE 2,685,637

ELECTRIC GRILLING APPLIANCE

Arthur Frederick Oatley, Tettenhall, England, assignor, by mesne assignments, to Cannon Industries Limited, Deepfields, near Bilston, England, a British company Application October 4, 1951, Serial No. 249,719

10 Claims. (Cl. 219—37)

This invention relates to electric grilling appliances which can be employed in conjunction with a cooking appliance such as a gas or an electric cooker, or may be used as a separate unit.

One object of the invention is to provide a grilling appliance having a grill element which can be moved from a position in which it is conveniently placed for use to a stowed position in which it presents little or no obstruction.

Another object of the invention is to provide an electric grilling appliance which, when mounted, say, at eye level above the hot plate of a cooker can be moved into a convenient position of use in which it is substantially horizontal or into a stowed position in which it is substantially vertical.

Another object of the invention is to provide a grilling appliance having a grill element and a pan support shelf beneath the element, which element and shelf are conveniently linked together so that they can be moved from a substantially horizontal position of use to a substantially vertical stowed position in which the element is enclosed in or covered by the shelf.

A further object of the invention is to ensure that the grill element is prevented from accidental displacement from its "in use" position.

A still further object of the invention is to provide means whereby a switch controlling the heating means of the grill element is prevented from being switched on until such time as the grill element is held in the "in use" position. Moreover, there is provided means whereby the grill element cannot be released from its position of use while the switch is on.

The invention is exemplified in the embodiments shown in the accompanying drawings in which:

Figure 1 is a front elevation and part sectional view of an electric grilling appliance mounted above the splash back of a cooking appliance, wherein the grilling appliance is in a position of use.

Figure 2 is a vertical cross-section on the line 2—2 in Figure 1.

Figure 3 is an enlarged part front elevational and part sectional view of an electric control switch interlocked with a catch adapted releasably to lock the grill element of the appliance in a position of use.

Figure 4 is a perspective view of the position of parts of the releasable catch when the grill element is in a substantially horizontal "in use" position.

Figure 5 is a perspective view showing the position of parts of the releasable catch when the grill element is in a substantially vertical, "stowed," position.

Figure 6 is a view similar to Figure 3 of a modified interlocking arrangement with a safety device interposed between the switch and the grill element.

In the drawings, a grill element indicated generally at 8 is supported between upright brackets or fixed supports 9 extending in this instance above the hot-plate of a cooking appliance such as an electric cooker and behind the usual splashback 10 of the cooker.

The grill element 8 consists of a coil of resistance wire 11 arranged in a continuous length from end to end of a number of grooves 12 in the face of a refractory backing member 13 which is provided, at one or more intervals on the front, with perforated lugs 14 through which the coiled wire 11 is passed. The ends of the element are connected to current leads 15 which are brought through a tubular trunnion 16 provided at one end of a dished sheet metal cover or carrier 17 of the refractory backing 13. The leads or conductors 15 are carried to a switch 18 with a suitable fuse 19 in the circuit and, to the switch 18, connections 20 from the supply mains will be carried in the ordinary way. The backing member 13 is supported on ledges 21 which extend inwards from the front and rear walls of the dished cover 17. At the other end of the cover 17 there is provided a trunnion or hinge pin 22. The common axis of the trunnions 16 and 22 is disposed slightly in advance of the rear edge of the grill element 8, as shown in Figure 2, in order to obtain an approximately correct grilling height of the element (i. e. eye level). The trunnion 22 takes a bearing in one of the supports 9 disposed in line with the side face of the cooker or splash back 10, while the other upright support 9 has a forwardly extending webbed portion 23 in a thickened boss 24 of which the hollow trunnion 16 is journalled. The web 23 is attached to or forms part of a panel part 25 (Figure 3) of the support 9 on which are mounted the switch 18 and fuse 19.

The switch 18 is most conveniently arranged on the panel 25 close to the trunnion 16 of the grill element 8, and a catch device 26 is arranged to hold the grill element 8 in a position of use, in which it is substantially horizontal, and to release it when desired. The catch device 26 takes the form of a bell crank 27 pivoted on a fixed part integral with or secured to the panel part 25. One arm 28 of the crank 27 is in the form of a detent and can be engaged with an arcuate slot 29 in a disc 30 turning with the trunnion 16. The slot 29 is provided at one end with a radial enlargement 31 into which the detent 28 of the bell crank 27 will snap under pressure of a return spring 32 to locate the grill element 8 in the position of use. When the detent 28 is released from the radial enlargement 31 at the end of the arcuate slot 29 by pressure on a thumb piece on the crank 27, the grill element 8 can rotate until the other end of the arcuate slot 29 comes against the detent 28 of the bell crank 27. Assuming that the slot 29 is quadrantal, as shown in the drawings, the permitted movement will enable the grill element 8 to rotate through 90° from the horizontal "in use" position to an approximately vertical "stowed" position.

It is preferred to interlock the switch 18 for connecting the resistance wire 11 with the supply with the locking catch 26, and this can be done by employing a rotary switch (as illustrated) and arranging on an extension 33 of the switch spindle a disc 34 with a part-circumferential notch 35. This notch 35 is so disposed that, in the "off" position of the switch 18, it is immediately beneath the arm 28 of the catch 26. When the detent 28 of the chank 27 is in the radial enlargement 31 of the disc 30 on the grill trunnion 16 the catch detent 28 is free from the disc 34 on the switch 18 and thus the switch 18 can be turned to switch on the current. While the switch 18 is "on" the element 8 cannot be tilted about its pivots 16 and 22 as the arm 28 of the catch cannot be disengaged from the locking radial enlargement 31 in the disc 30 since, in this position, it would come against the peripheral edge of the disc 34 on the extension 33 of the switch spindle.

When the switch 18 is turned into the "off" position and the element 8 is lowered, the switch 18 cannot be turned on again until the element 8 has been raised once again and locked in the raised position. This is because the detent 28 of the crank 27, which is pivoted on a fixed part, in moving out of the radial enlargement 31 in the trunion disc 30, has entered the notch 35 in the edge of the disc 34 on the switch spindle. In this position the detent 28 of the catch cannot be forced upwardly out of the notch 35 in the disc 34 on the switch spindle as it is in the arcuate part of the slot 29 on the trunnion disc 30 and is thus constrained from any radial movement by the wall of that part of the arcuate slot 29.

For interconnecting the grill element 8 with a hinged platform or support shelf 36 which receives a grilling pan (not shown), a link 37 pivoted at 38 to the disc 30 or say the grill cover 17 off the axis of the grill trunnions 16 and 22, extends to and is connected by means of a curved slot 39 with a pin or stud 40 on an extension part 41 of the platform or shelf 36 on the rearward side of the pivots or hinge 42 of the latter. When the shelf 36 is in the raised position as shown in chain-dotted lines in Figure 2, the connection pin or stud 40 on its rearward extension 41 is at the lowermost end of the curved slot in the link 37. The first part of the downward movement of the support shelf 36 is lost motion as the pin 40 traverses the curved slot 39 in the link 37 connected with the grill element 8. As the shelf 36 approaches the horizontal position shown in full lines in Figure 2 a thrust is applied through the link 37 to the grill element 8 so as to rotate it about the axis of its pivots 16 and 22 and raise it from the approximately vertical position to the horizontal position of use as shown in Figures 1 and 2. Similarly, when the shelf 36 is moved from the horizontal position of use to the vertical stowed position, shown in chain dotted lines in Figure 2, the element 8 will be permitted to rotate about its trunnion axis until it moves into a vertical stowed position as shown in chain-dotted lines in Figure 2. It will be evident that no movement of the interconnected grill element and shelf can take place unless the detent 27 of the catch device 26 is located in the arcuate slot 29 in the disc 30.

In the vertical position, the shelf is adapted to cover the element 8 and the panel 25 on which the switch 18, fuse 19 and parts of the catch 26 are mounted. As shown in Figure 1, that end of the shelf 36 which covers the panel 25 is dished at 43 to accommodate the switch handle 44 when the shelf 36 is raised.

As an additional safety device, the current leads 15 from the rotary switch 18 and fuse 19 to the element 8 can be interrupted, as shown in Figure 6, and connected respectively to sets of electric contacts 45 (such as the knife contacts illustrated) secured on confronting insulating plates 46 carried one on the disc 30 secured to the trunnion 16 and the other on the disc 34 secured to the extension 33 of the switch spindle. Thus, the sets of contacts 45 are so arranged that when the grill element 8 is rotated to the stowed position, the said contacts 45 are parted. If desired, a multi-heat and "off" switch may be provided so that the heat radiated by the grill unit in use can be varied. Conveniently, the supports 9 are bridged by a back panel 47 secured to the supports at or near their rear faces.

I claim:

1. An electric grilling appliance comprising a grill element, supports on which the grill element is rotatably mounted, a shelf hinged to the supports at a point below the element mounting, a link pivoted to the element and slidably engaging the shelf whereby movement of the shelf about its hinge towards a horizontal position of use causes a corresponding movement of the element, and vice versa, a manually controlled spring catch a part of which is mounted on one of the supports and another part of which is carried on the element, said catch being adapted releasably to retain the element in a substantially horizontal position of use, an electric rotary switch carried on that support upon which the catch part is mounted, and an interlock device on the switch which, when the element and shelf are in a substantially vertical, stowed position, engages the catch part mounted on the support and prevents the switch from being turned "on" until such time as the element and shelf have been moved to and retained by the catch in a substantially horizontal position of use when the catch part on the support will become disengaged from the interlock device to enable the switch to be turned "on" or "off" as desired.

2. An electric grilling appliance as specified in claim 10 having spaced insulating discs mounted in confronting relationship one on the trunnion and the other for movement with the rotary switch, and sets of electric contacts on the discs connected one set to the current conductors from the heating means and the other set to the current conductors from the switch, said sets of contacts being arranged to engage and complete the circuit from the heating means to the switch only when the grill element is moved to a substantially horizontal position of use.

3. An electric grilling appliance comprising in combination, an electric grill element having a heat-radiating surface on one side thereof and mounted on horizontal trunnions between fixed supports for rotation from a stowed pendant position in which a heat-radiating surface of the grill element is substantially vertical to a position of use in which said heat radiating surface is substantially horizontal and is directed downwardly, and vice versa, a catch mounted on one of the trunnions for rotation therewith, a rotary switch mounted on the grill element for rotation therewith and carrying a second catch member, and a manually controlled releasable latch on the support adjacent the catch, said latch being adapted to engage said first mentioned catch when the grill element is horizontal in a position of use and the switch is "on" and prevent movement of the grill element to its stowed position.

4. An electric grilling appliance comprising in combination, an electric grill element mounted between fixed supports for rotation about a substantially horizontal axis from a position of use in which a heat radiating surface of the element is horizontal and is directed downwardly, to a stowed position in which said surface is vertical, and vice versa, and a rotary switch and a latching device mounted on one of said supports, said latching device including a catch mounted on the grill element for rotation therewith relatively to a latch which is manually controlled and a second catch which is mounted on the switch for rotation therewith, said latch being adapted releasably to lock with the first catch only when the element is in a position of use and the switch is "on" and prevent movement of the element and, when the element is in a stowed position, releasably to lock with the second catch only and prevent movement of the switch from an "off" position until the element is in a position of use.

5. An electric grilling appliance comprising an electric grill element mounted between fixed supports for rotation about a substantially horizontal axis from a position of use in which a heat-radiating surface of the element is horizontal and is directed downwardly to a stowed position in which said surface is vertical, and vice versa, a food support hinged on said supports below said grill element for rotation about a substantially horizontal axis, from a position of use in which it is substantially horizontal to a stowed position in which it is susbtantially vertical, a link mechanism connecting said grill element and said food support and adapted when either the element or the food support is moved to cause opposite rotary movements of the food support or element respectively, and a manually controlled latching device adapted releasably to lock said element and food support in their substantially horizontal positions.

6. An electric grilling appliance having a grill element mounted on supports for rotational displacement through 90 degrees of angle relatively to the supports from a substantially horizontal position of use wherein a heat-radiating surface of the element is directed downwardly to a substantially vertical stowed position, an electric rotary switch carried on one of said supports, catches mounted for rotation one with the element and the other with the switch; a latch mounted on the switch-carrying support, and co-operating with said catches to prevent movement of the switch to an "on" position when the element is stowed and to prevent movement of the grill element from its position of use when the switch is "on," and a food support hinged to the supports below the level of the element and adapted, when in a raised position, to cover said element and its supports.

7. An electric grilling appliance as specified in claim 6 in which the latch comprises a spring-loaded pivoted detent engaging at one end a quadrantal slot in the catch on the grill element, said slot having at one end a radial recess in which the detent locates releasably to retain the element in a horizontal position.

8. An electric grilling appliance as specified in claim 6 in which the latch comprises a spring loaded pivoted detent engaging at one end, when the switch is "off," a radial slot in the catch on the switch.

9. An electrical grilling appliance comprising in combination, an electric grilling element mounted on and between fixed supports for rotation about a horizontal axis through 90 degrees of angle from a substantially horizontal position of use where a heat-radiating surface of the element is directed downwardly to a substantially vertical stowed pendant position, a food support hinged for rotation on said fixed supports in a position where its hinge axis is below and parallel to the axis of rotation of the grill element, link mechanism connecting said element and food support and adapted when either the grill element or the food support is moved from a substantially vertical stowed position to a substantially horizontal position of use to cause corresponding movement of the food support or element respectively, and vice versa, said food support being adapted to cover said element and its fixed supports when in the vertical stowed position, a rotary electric switch controlling the supply of current to the element and mounted on one of said fixed supports, and a manually controlled latching device including a catch rotating with the grill element, a second catch rotating with the switch and a manually controlled releasable latch mounted on one of the fixed supports in a position where it co-operates with said catches to prevent movement of said grill element and food support from their horizontal position of use when the switch is "on" and to prevent movement of the switch from an "off" position until the grill element and food support have been moved to their horizontal position of use.

10. In an electric grilling appliance having a rotatable electric grill element, a hollow trunnion for the grill through which trunnion are passed the current conductors for the heating means of the element, a flange on the trunnion, a quadrantal slot in the flange, an electric rotary switch axially aligned with the grill element, a catch on said switch, locking recesses in said catch and slot, and a manually controlled releasable spring-loaded latch pivotally arranged in one position to engage the recess in the slot and in another position to engage the recess in the catch.

References Cited in the file of this patent

UNITED STATES PATENTS

| Number | Name | Date |
| --- | --- | --- |
| 183,618 | Adrianson | Oct. 24, 1876 |
| 1,590,692 | Lewis | June 29, 1926 |
| 2,011,348 | Chambers | Aug. 20, 1935 |
| 2,109,006 | Davis | Feb. 22, 1938 |
| 2,207,307 | Teller et al. | July 9, 1940 |
| 2,417,977 | French | Mar. 25, 1947 |
| 2,598,814 | McAfee | June 3, 1952 |